Figure 1:
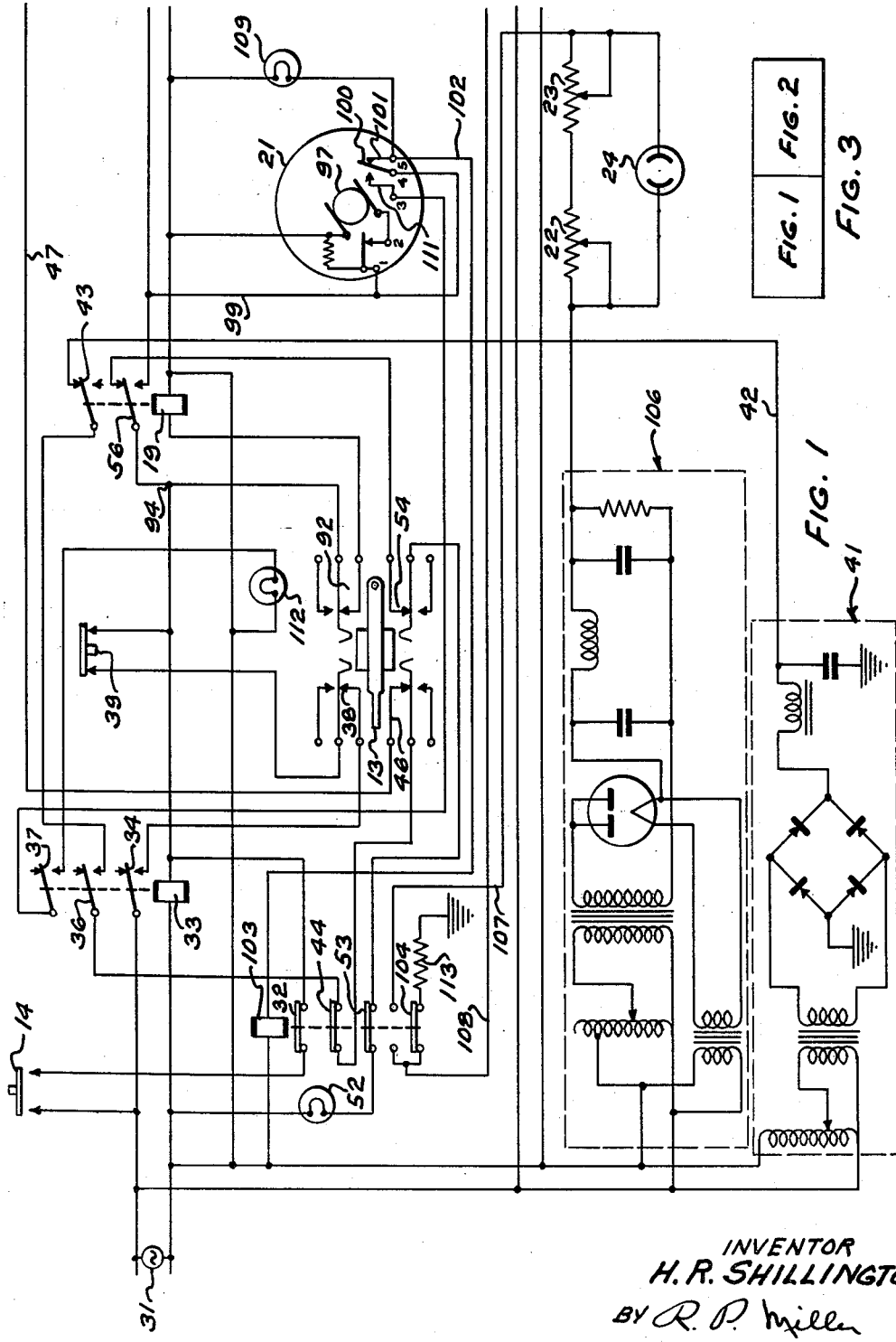

March 15, 1960  H. R. SHILLINGTON  2,929,021
CAPACITANCE AND BREAKDOWN TEST SET FOR CAPACITORS
Filed March 13, 1957  2 Sheets-Sheet 1

INVENTOR
H. R. SHILLINGTON
BY R. P. Miller
ATTORNEY

INVENTOR
H. R. SHILLINGTON
BY R. P. Miller
ATTORNEY

United States Patent Office 2,929,021
Patented Mar. 15, 1960

2,929,021

CAPACITANCE AND BREAKDOWN TEST SET FOR CAPACITORS

Harry R. Shillington, Glen Ellyn, Ill., assignor to Western Electric Company, Incorporated, New York, N.Y., a corporation of New York Application March 13, 1957, Serial No. 645,778

8 Claims. (Cl. 324—60)

This invention relates to a capacitance and voltage breakdown test set for capacitors, and more particularly to a test set for sequentially measuring the time required to accumulate a predetermined charge on a capacitor and then subjecting the capacitor to a breakdown voltage for a predetermined increment of time.

In the manufacture of capacitors, it is necessary to determine capacitance values within finite limits and also whether the capacitor will withstand the application of a predetermined breakdown voltage. Where mass production methods are employed, it is necessary to perform these tests with a minimum expenditure of time. It is a further requisite that the test facilities be simple to operate thereby enabling the employment of non-technical personnel. This can be accomplished only by avoiding test circuits that require individual adjustments for each test performed. It is thus apparent that bridge circuits requiring adjustments are not readily adapted for mass production testing. Further, it is necessary that the test facilities provide simple visual indicating means to apprise the attendant tester that a satisfactory test has been completed.

It is a primary object of the present invention to provide a relatively simple, accurate and economical test set for sequentially measuring the capacitance of a capacitor and then subjecting the capacitor to a voltage breakdown test.

Another object of the invention resides in a test circuit having switching facilities therein that will enable a sequential testing of a capacitor for capacitance and breakdown, and also be capable of performing one or the other test.

An additional object of the invention is the provision of a capacitor test set having time controlled elements for operating a relay-type switching circuit to control the periods that a capacitor is subjected to each of a sequence of tests.

A further and more finite object of the invention is the provision of an electronic counter circuit for ascertaining capacitance value that is initiated by the application of a charging potential to a capacitor and stopped by the acquisition of a predetermined charge on the capacitor together with a time control means for automatically connecting a circuit to the capacitor for ascertaining voltage breakdown characteristics.

With these and other objects in view, the present invention contemplates a sequentially operated test set for ascertaining (1) the capacitance of a capacitor and (2) whether or not a capacitor can withstand a predetermined breakdown voltage. At the instant of initiation of a capacitance test, an electronic decade counter is initiated into operation, and upon accumulation of a predetermined charge on the capacitor, facilities are rendered effective to generate and apply a stop pulse to the counter. Associated with each stage of the counter is a visual indicating means. Inasmuch as capacitance is known to be a function of the time required to accumulate a charge through a resistor on the capacitor, the actuated stages of the counter are indicative of the capacitance value of the capacitor. The indicating means associated with the operated stages will be illuminated; consequently, apprising the attendant tester of the capacitance value.

Following determination of the capacitance value, time controlled switching means are automatically rendered effective to connect the capacitor to a D.C. voltage of preconcerted magnitude for a precise increment of time. If the capacitor cannot withstand the applied voltage, a current is caused to flow across a resistor generating a voltage which operates a lamp to inform the attendant tester that the capacitor is defective.

Figure 2:
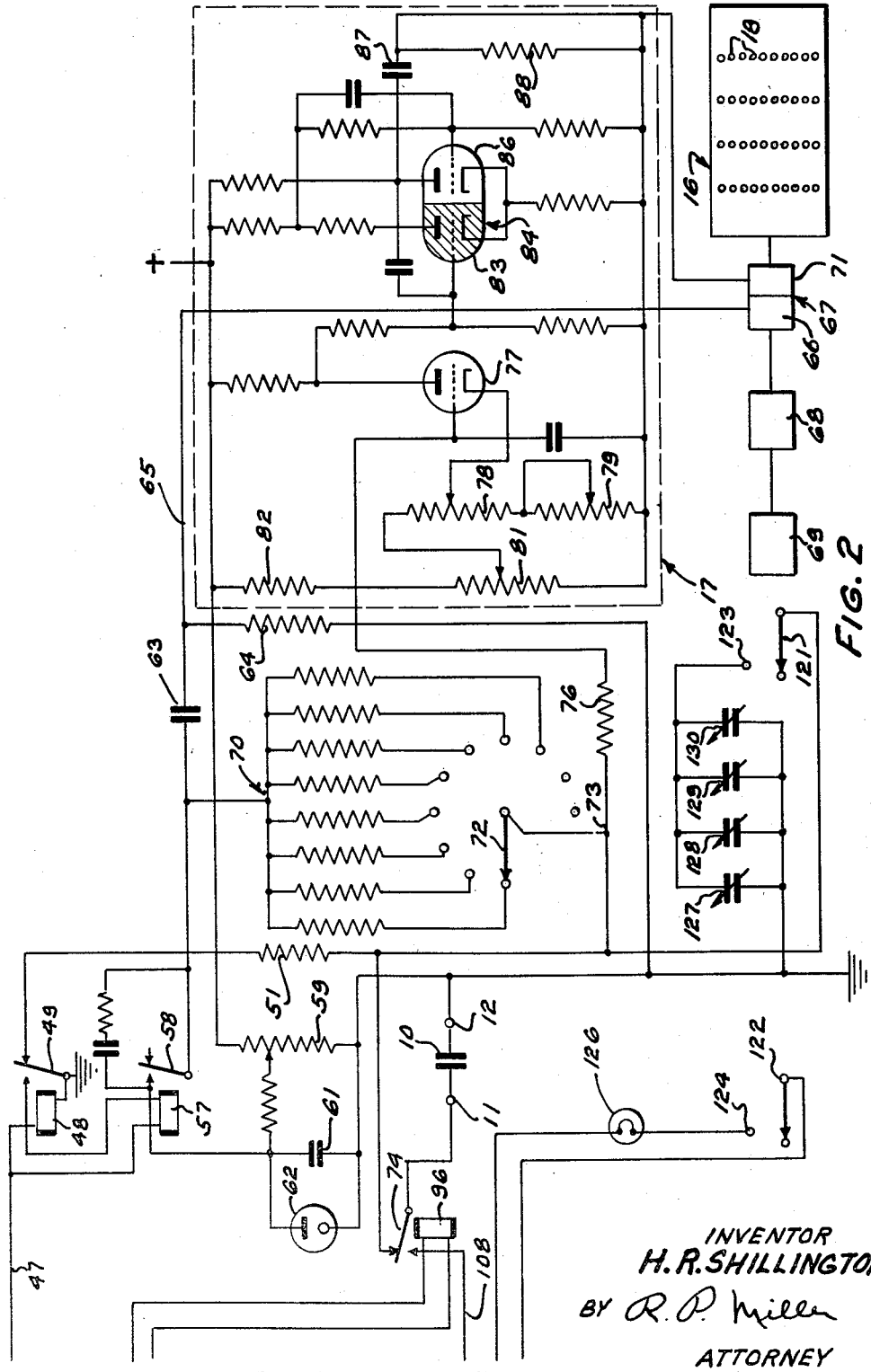

Other objects and advantages of the present invention will be apparent from the following detailed description when considered in conjunction with the accompanying drawings, wherein Figs. 1 and 2 when assembled in the manner depicted in Fig. 3 illustrate a test set for sequentially determining capacitance and voltage breakdown characteristics embodying the principles of the present invention.

Considering first the overall operation of the test set, a capacitor 10 to be tested is manually or automatically inserted between terminal contactors 11 and 12. With a key switch 13 positioned as shown in Fig. 1, the closure of a manual push-button 14 causes the capacitor to be subjected to a charging potential. Simultaneously therewith, a multi-stage decade electronic counter 16 is initiated into operation. Upon the capacitor accumulating a predetermined charge, a pulse generating circuit generally denoted by the reference numeral 17 is operated to produce and apply a pulse to stop the counter 16. This counter which may be of any one of a great number of commercially available types has indicating lights 18 associated with the stages; consequently, upon the counter being stopped the lamps associated with the operated stages will be illuminated. It is possible to calibrate the pulse generating means so that the lamps in each decade will be operated to give a correct reading of the capacitance value of the capacitor tested. This capacitance determining circuit is of the general type shown in the copending application of H. R. Shillington, Serial No. 645,689, filed March 13, 1957.

Upon completion of the capacitance measuring test, switching facilities under the control of a time delay relay 19 are rendered effective to apply a predetermined breakdown voltage to the capacitor. The duration of the application of the test voltage is controlled by a commercially available timer designated by the reference numeral 21. If the capacitor is defective, current flows through the capacitor and through a pair of resistors 22 and 23. The resultant voltage developed across the resistances causes a neon lamp 24 to be illuminated thereby apprising the attendant tester that the capacitor is defective.

Considering now the operation of the test set in detail, with the key switch 13 in the position illustrated in Fig. 1, the depression of the push-button switch 14 completes a circuit running from the A.C. source 31, through push-button 14, through contacts 32 to an A.C. relay 33. Relay 33 draws up contacts 34, 36 and 37. Closure of contacts 34 completes a locking circuit for the relay 33 which may be traced from the A.C. source through the now drawn up locking contacts 34, through contacts 38 associated with key switch 13, through a reset push-button switch 39 back to the relay 33. Closure of contacts 36 completes a circuit from a rectifier controlled source of D.C. voltage generally designated by the reference numeral 41, over a lead 42, through normally closed contacts 43, through the now drawn up contacts 36, through normally closed contacts 44, through contacts 46 associated with the key switch 13, over a lead 47 to a relay 48. Energization of relay 48 draws up contacts 49 to remove a resistor 51 from a circuit connected across the capacitor 10 under test.

At the instant the locking circuit for the relay 33 is completed, an energizing circuit is also completed for an indicating lamp 52 which may be traced from the A.C. source through the indicating lamp 52, through normally closed contacts 53, through closed contacts 54 associated with the key switch 13, through normally closed contacts 56 to the left side of the relay 33 which is also connected to the A.C. source. Illumination of the light 52 indicates to the attendant tester that a capacitance measuring test is being conducted by the test set.

Upon the contacts 49 being drawn up by relay 48, a circuit is completed from the lead 47 that is connected to the positive side of the rectifying circuit 41, through the windings of a relay 57, through the now drawn up contacts 49 to ground. Relay 57 draws up contacts 58 and completes a circuit that applies a charging voltage from a voltage divider comprising a resistance 59, a capacitor 61 and a voltage regulating tube 62 to a differentiating circuit consisting of a capacitor 63 and a resistance 64. The voltage wave applied to this circuit is differentiated by a circuit consisting of the capacitor 63 and resistor 64 to produce a positive going pulse that is applied over a lead 65 to one section 66 of a gating circuit generally designated by a reference numeral 67 that is connected through a pulse shaping device 68 to a free running oscillator 69. The gating circuit 67 may be of any of several well-known types that is opened upon the application of a pulse to one section 66 thereof and closed by the application of another pulse to a section 71 thereof. The application of the pulse to the section 66 opens the circuit to permit the oscillator output to be impressed through the wave-shaping circuit 68, through the gating circuit 67 to drive the multi-stage decade counter 16.

The voltage on the voltage regulating circuit consisting of components 59, 61 and 62, is also impressed through the drawn up contacts 58, through one resistor of a multibank resistor unit 70, through a switch wiper 72, through a junction point 73, through normally closed contacts 74, and through the terminal contactor 11 to the capacitor 10.

As the charge on the capacitor increases, the voltage at the junction point 73 will also rise. This junction point is connected through resistance 76 to the grid of an amplifier tube 77. Initial bias is placed on the cathode of amplifier tube 77 by means of an adjustable potentiometer consisting of resistances 78, 79 and 81 connected through a resistance 82 to the source of positive battery. After a relatively short interval of time, the potential on junction point 73 rises to such an extent that the grid potential of the tube 77 is raised sufficiently to permit the tube 77 to commence conduction. Immediately thereupon the anode potential of this tube drops to impress a decreased potential condition on the grid of a lefthand triode 83 of a one-shot multivibrator generally designated by the reference numeral 84. Circuit parameters are selected for the multivibrator 84 so that the lefthand triode 83 is normally conducting and a righthand triode 86 is maintained in a state of non-conduction. When the decreased potential condition is impressed on the grid of the lefthand triode 83, this triode assumes a non-conducting condition, and a differentiated positive pulse is impressed through a coupling circuit to the grid of the righthand triode 86, thus placing this triode in a state of conduction. The anode potential of triode 86 drops to impress a decreased potential condition through a differentiating circuit consisting of a capacitor 87 and a resistance 88 to the righthand section 71 of the gating circuit 67. This action causes the gating circuit to preclude further application of output pulses from the oscillator 69 to the multi-stage decade counter 16. The counter now stops and lamps 18 in each decade are illuminated, which are indicative of the time that the counter has been operating.

If a standard capacitor of known capacitance value is inserted between terminal contactors 11 and 12 and an adjustment made of the potentiometer resistances 78, 79 and 81, then it is possible to have lamps illuminated in each decade of the counter that are representative of the capacitance value of the standard capacitor. Now when a capacitor of unknown capacitance value is placed between the terminal contactors 11 and 12, and if this capacitor has the same capacitance value as that of the standard capacitor then the same lamps will be illuminated in each decade of the counter 16. However, if other than these lamps are illuminated then the attendant tester will be apprised of the fact that the capacitor under test has a capacitance value other than that of the standard capacitor. If this reading is much different from that obtained with the use of the standard capacitor in the circuit then the attendant tester will realize that the capacitor is defective.

If the capacitor has a capacitance value other than that of the standard capacitor, the illuminated lights in the several decades give a direct reading of the actual capacitance value. It is thus apparent that this section of the circuit can be utilized to obtain direct readings of unknown capacitance values.

When the relay 33 is energized, the relay 19 is also energized. It does not immediately draw up associated contacts 43 and 56 because this is a delay-type relay. The energizing circuit for this relay may be traced from one side of the A.C. line through the relay 19, through normally closed contacts 92 associated with the key switch 13, through a junction point 94 to the righthand side of the relay 33 which will be recalled as being connected to the opposite line of the A.C. source. When the relay 19 is eventually operated, the opening of contacts 43 interrupts the energizing circuits for the relays 48 and 57 thereby interrupting the charging circuit to the capacitor 10. The circuit running to the gating circuit 67 is also interrupted.

When relay 19 draws up contacts 56, an energizing circuit is completed to a relay 96 that functions to draw up contacts 74 connected to the capacitor 10 under test. Closure of contacts 56 also completes an energizing circuit for a motor 97 of the motor-driven cam controlled timer generally depicted by the reference numeral 21. Closure of contacts 56 also completes an energizing circuit from one side of the A.C. source over a lead 99, through a cam controlled contactor 100 in engagement with a contact 101, over a lead 102 through a relay 103 to the other side of the A.C. source. Relay 103 draws up contact 53 to interrupt the energizing circuit for the light 52 which will be recalled as the means for indicating to the operator that a capacitance measuring test was being conducted by the test set.

Relay 103 also draws up contacts 104 to complete a circuit for applying breakdown voltage to the capacitor 10. This circuit may be traced from a rectifier controlled network 106 through resistances 22 and 23, over a lead 107, through now drawn up contacts 104, over a lead 108, through the now drawn up contacts 74 to the capacitor 10. When the contactor 100 and contact 101 of the timer 98 are initially energized by the closure of the contacts 56, a circuit is also completed through an indicating lamp 109 to apprise the attendant tester that a voltage breakdown test is in progress. If the capacitor 10 subjected to breakdown voltages is defective, current will flow from the rectifier controlled network 106 through the resistances 22 and 23; consequently, developing a voltage across these resistances which is effective to operate the neon lamp 24. Illumination of the neon lamp 24 indicates to the attendant tester that the capacitor 10 is defective.

When the cam (not shown) within the timer 21 moves the contactor 100 from engagement with the contact 101 and into engagement with a contact 111, then the relay 103 is deenergized to interrupt the application of breakdown voltage to the capacitor 10. Closure of contactor 100 with contact 111 completes a circuit from one line of the A.C. source, through a capacitor discharge indicating lamp 112 through the drawn up contacts 37, through the now closed contact 111 and contactor 100, over the lead 99 to the other side of the A.C. source.

When relay 103 deenergizes, the contacts 104 are moved into position to connect a resistance 113, over the lead 108, through the still drawn up contacts 74 to the capacitor 10. The capacitor 10 will now be permitted to discharge through the resistance 113.

Upon completion of a test, the attendant tester need only open the push-button switch 39 to deenergize the relays 33 and 19 to restore the circuit to the initial condition in preparation for the test of another capacitor.

When it is desired to operate the test set to measure capacitance values only then the key switch 13 is moved to open the contacts 38 and 92. The opening of the contacts 92 precludes the energization of the relay 19 that normally functions to control the application of the breakdown voltage to the capacitor 10. As previously discussed the locking circuit for the relay 33 included the contacts 38, but when these contacts 38 are opened an auxiliary locking circuit is still provided for the relay 33. This circuit may be traced through the indicator lamp 52, through the normally closed contacts 54, through the closed contacts 56, through the junction point 94 to the relay 33. When it is desired to only use the test set for the application of breakdown voltage to a capacitor 10, then the key switch 13 is moved to open the contacts 46 and 54. With the switch in this position, the D.C. circuits running to the relays 48 and 57 are opened.

If during the course of a run of tests, it is desired to check the accuracy of the counter 16 to give readings indicative of the capacitance value of the standard capacitor, then a pair of contactors 121 and 122 (Fig. 2) are moved into engagement with contacts 123 and 124. Closure of contactor 122 with contact 124 completes an energizing circuit from the A.C. source through an indicator lamp 126 to indicate to the attendant tester that the auxiliary circuit is connected to control the counter 16. A series of capacitors 127 through 130 are connected in parallel and adjusted so that the effective capacitance value equals that of a standard capacitor. It will be noted that this capacitance network is connected in parallel with the terminals 11 and 12, and if there is no capacitor 10 between these terminals then the operation of the push-button 14 will apply the charging potential at junction point 73 to the capacitance network 127 through 130. It will be recalled that junction point 73 is connected to the amplifier tube 77; consequently, when the potential at junction point 73 reaches a sufficient value, the tube 77 will be operated to initiate a cycle of operation of the one-shot multivibrator 84 to produce a pulse that functions to stop the electronic counter 16. The attendant tester then will note the actuated lamps in each decade of the counter 16 and this reading should correspond with the reading that was obtained at the time a standard capacitor was inserted between the terminals 11 and 12 to initially calibrate the circuit.

It is to be understood that the above-described arrangement of circuits and construction of component devices are simply illustrative of an application of the principles of the invention and many other modifications may be made without departing from the invention.

What is claimed is:

1. In an apparatus for sequentially measuring capacitance of a capacitor and then subjecting the capacitor to a breakdown voltage test, a source of charging potential, a switching circuit including a time delay relay for applying said charging potential to said capacitor, means selectively connected to said capacitor by the switching circuit and the application of the charging potential for measuring capacitance in accordance with the charge accumulated on the capacitor, a source of breakdown voltage, means operated by the accumulation of a predetermined charge on the capacitor for rendering said measuring means ineffective, said time delay relay operating said switching circuit to interrupt the application of charging potential and connect the source of breakdown voltage to said capacitor, and means for indicating current flow through the capacitor when subjected to said breakdown voltage.

2. In a capacitor testing apparatus, a time measuring counter, a source of charging potential, means for simultaneously initiating said counter and applying said charging potential to a capacitor under test, means responsive to the accumulation of a predetermined charge for stopping said counter, a source of breakdown voltage, time control means for disrupting the application of charging potential and applying said breakdown voltage, a discharge resistor, and a second time control means initiated into operation by the first time delay means for interrupting said application of breakdown voltage and connecting said capacitor to said discharge resistor.

3. In a capacitor testing circuit, means for subjecting the capacitor to a charging potential, means operatively connected to said capacitor for measuring the time required to accumulate a predetermined charge on said capacitor, a time delay relay means actuated after a predetermined time for interrupting said charging means and disconnecting said measuring means, a source of breakdown voltage, means operated by said time delay relay means for connecting said source of breakdown voltage to said capacitor, means for indicating current flow through said capacitor, and means for interrupting said application of breakdown voltage after a predetermined time.

4. In a test set for ascertaining capacitance and voltage breakdown characteristics of a capacitor, a multi-stage decade counter, means for applying a charging potential to the capacitor, means actuated by said voltage applying means for initiating operation of said counter, means responsive to the accumulation of a predetermined charge on said capacitor for stopping said counter, means for adjusting said stopping means to stop the counter so that stages in each decade are operated that are indicative of the capacitance of the capacitor, a time delay switching means initially energized by the operation of said charging potential applying means, means operated by said time delay switching means for interrupting the application of said charging potential, a source of breakdown voltage connected to said capacitor by operation of said time delay switching means, and a timer initiated by said time delay switching means for interrupting the application of said breakdown voltage.

5. In a capacitance measuring and voltage breakdown test set, means for applying a potential of predetermined magnitude to a capacitor, a time measuring device, means controlled by said application of potential for initiating operation of said time measuring device, means rendered effective by the capacitor accumulating a predetermined charge for stopping said time measuring device, a time delay relay means initially energized by the means for applying the charging potential, means actuated by said time delay relay means after a predetermined time delay for interrupting the application of charging potential to said capacitor, means operated by the time delay relay means for applying a breakdown voltage to said capacitor, means for interrupting application of said breakdown voltage after a predetermined period of time, and means for indicating breakdown conduction of said capacitor.

6. In an apparatus for sequentially measuring capacitance of a capacitor and subjecting the capacitor to a breakdown voltage test, a source of constant potential, a switching circuit for connecting and applying said potential to said capacitor, an electronic multi-stage decade counter having indicating means associated with each stage in each decade, means controlled by the switching circuit for initiating the counter at the time of application of the charging potential, a pulse generating control circuit operated by the accumulation of a predetermined charge on the capacitor for generating a pulse to stop the counter whereby the operated indicating means represents the time required to accumulate said predetermined charge, means for adjusting the pulse producing circuit to produce a pulse which stops the counter at a time that is indicative of capacitance, a source of breakdown voltage, a time delay relay for actuating the switching circuit to disconnect the charging potential and counter and then connect the breakdown voltage to said capacitor, means for indicating voltage breakdown, a discharge resistor circuit, a timer initiated by said time delay relay for disconnecting said breakdown voltage and connecting said discharge resistor circuit to said capacitor.

7. In an apparatus for sequentially measuring capacitance of a capacitor and subjecting the capacitor to a breakdown voltage test, a source of charging potential, a source of breakdown potential, switching means for sequentially applying the charging potential to said capacitor and then said breakdown potential, a counter, means operated by the switching means applying the charging potential for initiating the counter into operation, means operated by the accumulation of a predetermined charge on the capacitor for stopping the counter, and a time delay relay for operating the switching means following the stopping of the counter.

8. In a capacitor testing set, a source of charging potential, a source of breakdown potential, a switching circuit adapted to successively apply the charging potential and the breakdown potential to a capacitor under test, a counter, a gating circuit for controlling the operation of the counter, means operated by the application of the charging potential for operating the gating circuit to initiate operation of the counter, means operated by the accumulation of a predetermined charge on the capacitor for operating the gating circuit to interrupt operation of the counter, a time delay relay initially operated by operation of the switching circuit and rendered effective subsequent to the interruption of the operation of the counter for operating said switching circuit to apply the breakdown potential to the capacitor, a discharge circuit, and a timer operated by the time delay relay for connecting the capacitor to the discharge circuit after a predetermined time.

References Cited in the file of this patent
UNITED STATES PATENTS

| | | |
|---|---|---|
| 1,853,639 | Robinson | Apr. 12, 1932 |
| 2,596,396 | Foust | May 13, 1952 |
| 2,601,491 | Baker | June 24, 1952 |